Jan. 23, 1968     H. P. LANGER     3,364,754
CONTROLLERS
Filed May 16, 1966
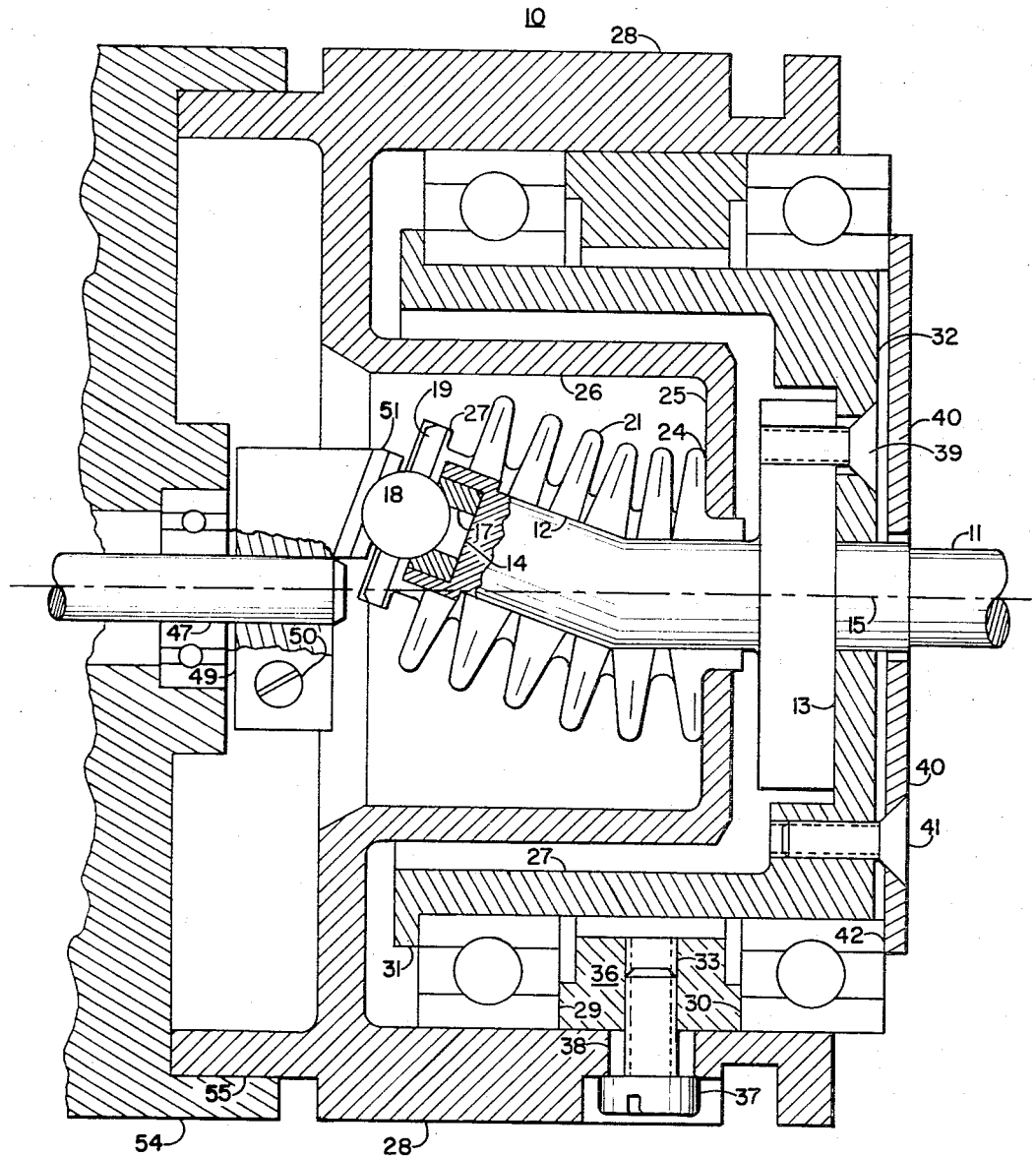
INVENTOR.
HERBERT P. LANGER
BY Gordon Reed
ATTORNEY United States Patent Office 3,364,754
Patented Jan. 23, 1968

3,364,754
CONTROLLERS
Herbert P. Langer, Minneapolis, Minn., assignor to Honeywell Inc., Minneapolis, Minn., a corporation of Delaware
Filed May 16, 1966, Ser. No. 550,319
7 Claims. (Cl. 74—18.1)

The invention described herein was made in the performance of work under a NASA contract and is subject to the provision of Section 305 of the National Aeronautics and Space Act of 1958, Public Law 85–568 (72 Stat. 435; 42 U.S.C. 2457).

This invention relates to motion transmitting devices and more particularly to a motion transmission device for transmitting rotary motion from one shaft from an external source into rotary motion to a second shaft in a hermetically sealed instrument casing. In many applications, especially where high reliability is desired, it is imperative that an actuated instrument such as an electrical switch be hermetically sealed from an external operating means therefor. In other words, sealed-in devices such as switches or instruments find great applications in spacecraft when they operate in an environment where the surrounding atmosphere may be laden with impurities, such as water vapor, gases, or dust and the like. Sealed-in instruments and controllers also find applications when they are enclosed within a casing filled with inert gas and it is undesired to permit any seepage into or from the interior of such casing.

It is an object of this invention to provide an improved rotary-to-rotary transmitting device.

It is a further object of this invention to provide an improved rotary-to-rotary motion transmission device having an improved hermetically sealed transmission arrangement between one rotary member and a second rotary member.

It is a further object of this invention to provide a rotary-to-rotary motion transmission arrangement with novel means for preventing back-lash between the two rotary members.

It is a further object of this invention to provide an improved rotary-to-rotary transmission arrangement with means for varying the back-lash between the two rotary members.

It is a further object of this invention to provide a novel rotary-rotary motion transmission arrangement using a hermetic seal between the two devices with adjustable means to control the back-lash between the two rotary members.

The above and other objects and advantages of this invention will become apparent from the following detailed description when taken in conjunction with the subjoined drawing which illustrates a preferred form of the construction of the invention.

The sole figure is a sectional view of the hermetically sealed drive, rotary-to-rotary ball and socket transmission arrangement.

According to the invention, a drive shaft has an end inclined to the shaft axis at an acute angle relative to the axis of the shaft and has a socket therein which supports a sperical member or ball in sliding relationship. The spherical member has a collar to which is hermetically sealed or secured one end of a bellows seal of flexible sleeve-like member and the opposite end of the bellows or member is hermetically affixed or secured respectively to a casing surrounding the main shaft portion. The spherical ball in turn fits into a socket supported on an arm extending laterally from a driven shaft member. Rotation of the drive shaft to the driven shaft is communicated through the lateral extended portion of the drive shaft, to the spherical member, and thence to the lateral extended arm on the second shaft or driven shaft. The sealed connection or hermetic seal between the bellows and the collar of the spherical member as well as to the casing prevents any leakage to or from the environment within which the first shaft rotates, to the second shaft.

Referring to the sole figure, a drive shaft 11 has at one end a lateral member. This member may be a portion 12 thereof inclined at an acute angle to the axis of rotation 15 of shaft 11. Intermediate the main shaft portion and the laterally extended end is a collar 13 fixed to the shaft. At the free end of the laterally extended portion, a circular recess is provided having an inner or bottom wall 14. Within this recess, there is fitted a bushing 17. The side of the bushing opposite to that bearing against bottom 14 is cut away in a suitable manner to provide a socket for a sperical member 18. The spherical member 18 is integral with an external collar 19, and to this collar 19, there is secured or hermetically sealed one end 27 of a flexible sleeve-like member or bellows 21. The opposite end 24 of the member or bellows is secured to or hermetically sealed to an end wall 25 of a cup shaped circular casing 26 that substantially surrounds the bellows 21.

The casing 26 as thus far described is somewhat cup shaped and additionally has an external wall 28 in a sense, bent back, to form a circular recess or cylindrical void between the cup shaped portion and the outer wall 28. Within this recess, there is received the cylindrical portion of a second cup shaped member 27. An end wall 32 of the second cup shaped member 27 has an enlarged opening therein for receiving shaft 11. A fastening screw 39 passes through a hole in end wall 32, and its threaded part engage a threaded hole in collar 13 on shaft 11, whereby the second cup shaped member 27 is made integral with shaft 11. Three of these screws, circumferentially spaced, are actually provided in the physical embodiment.

In the spacing between the reversely bent wall 28 and the cylindrical wall of the second cup shaped member 27 and thus between two cylindrical walls there are arranged two spaced ball bearing races 29 and 30. The cup shaped member 27 has an outwardly directed end 31 which serves as a stop member for bearing race 29. Intermediate the two bearing races 29 and 30, is a split ring 36. The ring 36 is T shaped in cross-section. It has three peripherally spaced radially tapped holes, one of which 33 is shown. A screw 37 which passes through an axially extended slot 38 in wall 28 is threaded into the tapped hole 33. The T-shaped ring 36 for purpoes of radial expansion thereof upon tightening of the three screws 37 is cut in an axial slot direction (not shown) completely through its periphery. Thus, upon tightening of the three screws, the T-shaped split ring is firmly held against the inner side of circular wall 28 to secure the wall 28 against axial displacement relative to the circular wall of the cup shaped member 27.

An outer circular end plate 40 is fastened to the end wall 32 of the second cup shaped member 27 by means of circumferentially spaced screws 41, one only of which is shown for simplicity. An outer portion 42 of the face of disc 40 engages the remaining end of the bearing race 30. The plate 40 has a central opening through which the shaft 11 passes. It will be evident that upon loosening the three screws 37 and due to the slotted opening 38 that the inner cup shaped member 27 may be moved axially with respect to the outer cylindrical wall 28 selectively and thereafter when a desired position has been attained, the screws 37 may be tightened.

A driven shaft and its associated arm will now be described. A driven shaft 47 concentric with drive shaft 11 has mounted thereon a laterally directed member or arm 49 which may be machined from the shaft or may be a special arm 49 affixed to the shaft by suitable fastening means such as screw 50. Arm 49 has a portion 51 thereof provided with a suitable recess or socket for receiving the spherical member 18. The arrangement is such that the axis of the socket in portion 51 is colinear with the socket in bushing 17 and passes through the center of spherical member 18.

To remove the back-lash between the drive shaft 11 and driven shaft 47, the screws 37 may be loosened. The driven shaft 47 is held against axial displacement in its casing 54. Casings 27 and 54 are soldered or secured together at circular surface 55. An axial force now is applied on drive shaft 11, whereby the spherical member 18 now fits snugly without lost motion in the sockets of members 17 and 51 at which time the screws 37 may be tightened to maintain this desired driving relationship.

*Operation*

With the application of a low torque thereto, drive shaft 11 is rotated. Since bellows 21 is secured at one end to end wall 25, which does not rotate, and the spherical member 18 sealed to the other end of bellows 21 engages the socket in bushing 17, the member 18 receives a gyratory and rolling motion with the walls of the bellows 21 expanding or contracting during the rotation of shaft 11. During such rotation, slippage or rolling action is permitted between the spherical member 18 and the socket in bushing 17. The motion applied to spherical member 18 is transmitted to arm 49 on driven shaft 47 causing the rotation of the driven shaft.

The materials of which the socket members and spherical member 18 is made should be such as to withstand the transmission of the rotary action with little wear. The parts which relatively move with respect to each other may have applied thereto a suitable lubricant such a molybdenum disulphide for extended operation.

It will be understood that various changes in the construction and arrangement of parts of the illustrated embodiment of the invention may be made without departing from the spirit and scope of the invention as defined in the appended claims.

What is claimed is:

1. In actuating means for a rotary switch or the like having an operating or driven shaft:
    a member extending laterally from said driven shaft and having a ball receiving socket means in the free end of said member;
    means mounting a drive shaft parallel with the driven shaft, with one of said shafts being supported for axial adjustment relative to said other shaft;
    a member extending laterally from the drive shaft and having a socket receiving a ball in its free end, for rotary motion transmission between the shafts;
    and means for holding the axial adjustable shaft in selected adjusted position while holding the other shaft against axial displacement whereby force may be initially applied between the drive shaft, the ball, and the lateral member of the driven shaft to remove lost motion in the ball and socket motion transmission arrangement between the driven and drive shafts.

2. The apparatus of claim 1 wherein the driven shaft is held in substantially fixed axial position, and the drive shaft is held in selected axial position relative to said driven shaft.

3. In a rotary switch having an operating or driven shaft mounted within a casing,
    a laterally inclined member having one end secured to said shaft;
    a drive shaft concentric with said driven shaft supported within a casing, one of said shafts being axially adjustable to selected position relative to said other shaft;
    an inclined laterally directed member having one end secured to the drive shaft;
    and roll action, motion transmission means between the two members, for rotating one shaft by rotation of the other.

4. In a motion transmission arrangement:
    a rotatable shaft;
    an arm laterally inclined at less than 90 degrees from one end of the shaft;
    a ball receiving socket arranged in the free end of the arm;
    a member having a ball centrally held thereby, said ball being received into said socket;
    a casing for said shaft; and
    a cylindrically shaped casing having flexible walls surrounding said arm, said flexible casing being fastened at one end to said first casing and fastened at the other end to said member thereby causing the flexible walls to change in length at various elements of said flexible casing during rotation of said shaft.

5. The apparatus of claim 4, a second shaft concentric with said first shaft and having an arm laterally inclined at less than 90 degrees from one end of the second shaft;
    a ball receiving socket in the free end of said arm; and
    means for axially moving one shaft said other shaft being axially remaining fixed whereby causing the ball to engage the socket in both arms to remove lost motion and the motion transmission arrangement.

6. The actuating means of claim 1, and means sealing one shaft from the other shafts, comprising a flexible sleeve-like member having one end secured to a circular periphery of the ball and its opposite end connected to a casing of one shaft.

7. The actuating means of claim 6, wherein the flexible sleeve-like member is a bellows, and the ends thereof are hermetrically sealed to the ball and casing of one shaft.

References Cited

UNITED STATES PATENTS 3,051,008   8/1962   Hamren _____ 74—18.1

FRED C. MATTERN, Jr., *Primary Examiner.*

F. D. SHOEMAKER, *Assistant Examiner.*